United States Patent
Siu

(10) Patent No.: US 12,058,451 B2
(45) Date of Patent: Aug. 6, 2024

(54) SIMULTANEOUSLY CAPTURING IMAGES IN LANDSCAPE AND PORTRAIT MODES

(71) Applicant: Donald Siu, Santa Ana, CA (US)

(72) Inventor: Donald Siu, Santa Ana, CA (US)

(*) Notice: Subject to any disclaimer, the term of this patent is extended or adjusted under 35 U.S.C. 154(b) by 0 days.

(21) Appl. No.: 18/506,865

(22) Filed: Nov. 10, 2023

(65) Prior Publication Data

US 2024/0080578 A1 Mar. 7, 2024

Related U.S. Application Data

(63) Continuation of application No. 17/822,658, filed on Aug. 26, 2022, now Pat. No. 11,818,472.

(60) Provisional application No. 63/267,360, filed on Jan. 31, 2022.

(51) Int. Cl.
*H04N 23/90* (2023.01)
*H04N 23/45* (2023.01)
*H04N 23/54* (2023.01)

(52) U.S. Cl.
CPC .............. *H04N 23/90* (2023.01); *H04N 23/45* (2023.01); *H04N 23/54* (2023.01)

(58) Field of Classification Search
CPC ........ H04N 23/90; H04N 23/45; H04N 23/54; H04N 5/2628; H04N 7/181; H04N 23/80; H04N 23/667; H04N 7/183; G08B 3/10; G08B 13/196
See application file for complete search history.

(56) References Cited

U.S. PATENT DOCUMENTS

| | | | |
|---|---|---|---|
| 7,441,204 B2* | 10/2008 | Thomson | G06F 3/0481 715/827 |
| 7,577,923 B2* | 8/2009 | Beam | G06F 3/0481 715/833 |
| 7,730,422 B2* | 6/2010 | Russo | G06F 3/04817 715/833 |
| 9,721,375 B1* | 8/2017 | Rivard | G09G 5/37 |
| 9,749,549 B2 | 8/2017 | Shroff | |
| 10,225,445 B2 | 3/2019 | Lautenbach | |
| 11,270,464 B2 | 3/2022 | Cutler | |

(Continued)

FOREIGN PATENT DOCUMENTS

JP 5710274 B2 3/2015

OTHER PUBLICATIONS

International Search Report and Written Opinion mailed Jun. 27, 2023 for International Patent Application No. PCT/US23/61165.

*Primary Examiner* — Hung H Lam
(74) *Attorney, Agent, or Firm* — Perkins Coie, LLP

(57) ABSTRACT

Video or image capture device and method of operation of the capture device are described. One example apparatus includes a first sensor array comprising a first plurality image sensors, a second sensor array comprising a second plurality image sensors; a third sensor array comprising a third plurality image sensors; a fourth sensor array comprising a fourth plurality image sensors and a fifth sensor array comprising a fifth plurality image sensors. The second sensor array and the fourth sensor array are configured to be excluded from use for capturing images in a portrait format. The third sensor array and the fifth sensor array are configured to be excluded from use for capturing images in a landscape format. The first sensor array is configured to be used for capturing images in the portrait format and the landscape format.

20 Claims, 13 Drawing Sheets

Image sensor is shown below with pixel blocks 1, 0 and 3 enabled, while pixel blocks 2 and 4 are disabled.

(56) References Cited

U.S. PATENT DOCUMENTS

| | | | |
|---|---|---|---|
| 11,297,260 B1* | 4/2022 | Siu | H04N 5/91 |
| 11,497,382 B1* | 11/2022 | Ikuta | A61B 1/00096 |
| 2006/0146059 A1* | 7/2006 | Inoue | G06F 3/0481 |
| | | | 345/546 |
| 2013/0258044 A1 | 10/2013 | Betts-Lacroix | |
| 2014/0320715 A1 | 10/2014 | Haji-Khamneh et al. | |
| 2017/0035293 A1 | 2/2017 | Nistico et al. | |
| 2017/0187933 A1* | 6/2017 | Duparre | H04N 25/41 |
| 2017/0363949 A1 | 12/2017 | Valente et al. | |
| 2020/0128201 A1 | 4/2020 | Glimm | |
| 2021/0267695 A1* | 9/2021 | Hazelton | A61B 1/00154 |
| 2022/0279131 A1* | 9/2022 | Gong | H04N 23/695 |

* cited by examiner

SIMULTANEOUSLY CAPTURING IMAGES IN LANDSCAPE AND PORTRAIT MODES

CROSS-REFERENCE TO RELATED APPLICATION

This application is a continuation of U.S. patent application Ser. No. 17/822,658, filed Aug. 26, 2022, which claims the benefit of priority to U.S. Provisional Patent Application No. 63/267,360, filed Jan. 31, 2022. The entire contents of the above-noted applications are incorporated by reference as part of the disclosure of this document.

TECHNICAL FIELD

The present document relates to image and video capture technologies using a handheld electronic device with a camera.

BACKGROUND

Nowadays, most handheld computing devices come equipped with a camera. Users use these devices for capturing video and images.

SUMMARY

This document discloses techniques capturing video and images simultaneously in landscape and portrait mode using a camera.

In an example aspect, a video capture device is disclosed. The video capture device includes apparatus includes a first sensor array comprising a first plurality image sensors, a second sensor array comprising a second plurality image sensors; a third sensor array comprising a third plurality image sensors; a fourth sensor array comprising a fourth plurality image sensors and a fifth sensor array comprising a fifth plurality image sensors. The second sensor array and the fourth sensor array are configured to be excluded from use for capturing images in a portrait format. The third sensor array and the fifth sensor array are configured to be excluded from use for capturing images in a landscape format. The first sensor array is configured to be used for capturing images in the portrait format and the landscape format.

In another aspect, a method of camera operation is disclosed. The method includes initiating a capture of an image or a video capture based on an instruction received on a user interface of a camera that comprises the disclosed apparatus and storing the captured image or the video to three or more of the first to fifth sensor arrays according to the instruction.

In another example aspect, a video capture device that includes a processor is disclosed. The apparatus is configured to implement one of the methods described herein.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. Furthermore, throughout this document, the term video is used for compactness, and it will be understood that the described techniques are applicable to capture and storage of both video (a sequence of pictures) or a single picture or an image or a photo. Furthermore, for ease of description, the term "phone" "mobile phone" or "cellphone" is used to describe a variety of different handheld devices that include a camera. Such devices include handheld tablets, pads, laptops, electronic book readers, and so on.

Figure 1:
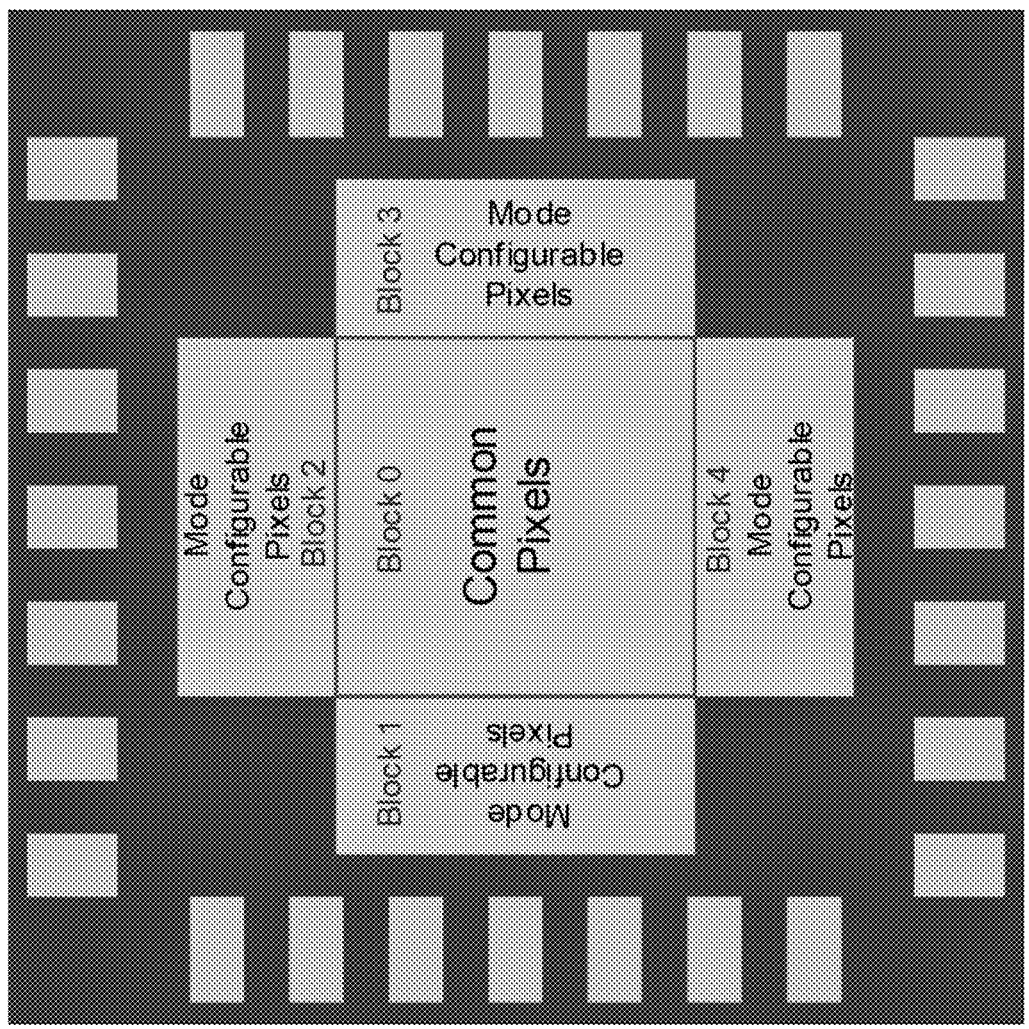
FIG. 1 shows an example of a single camera integrated circuit.
Figure 2:
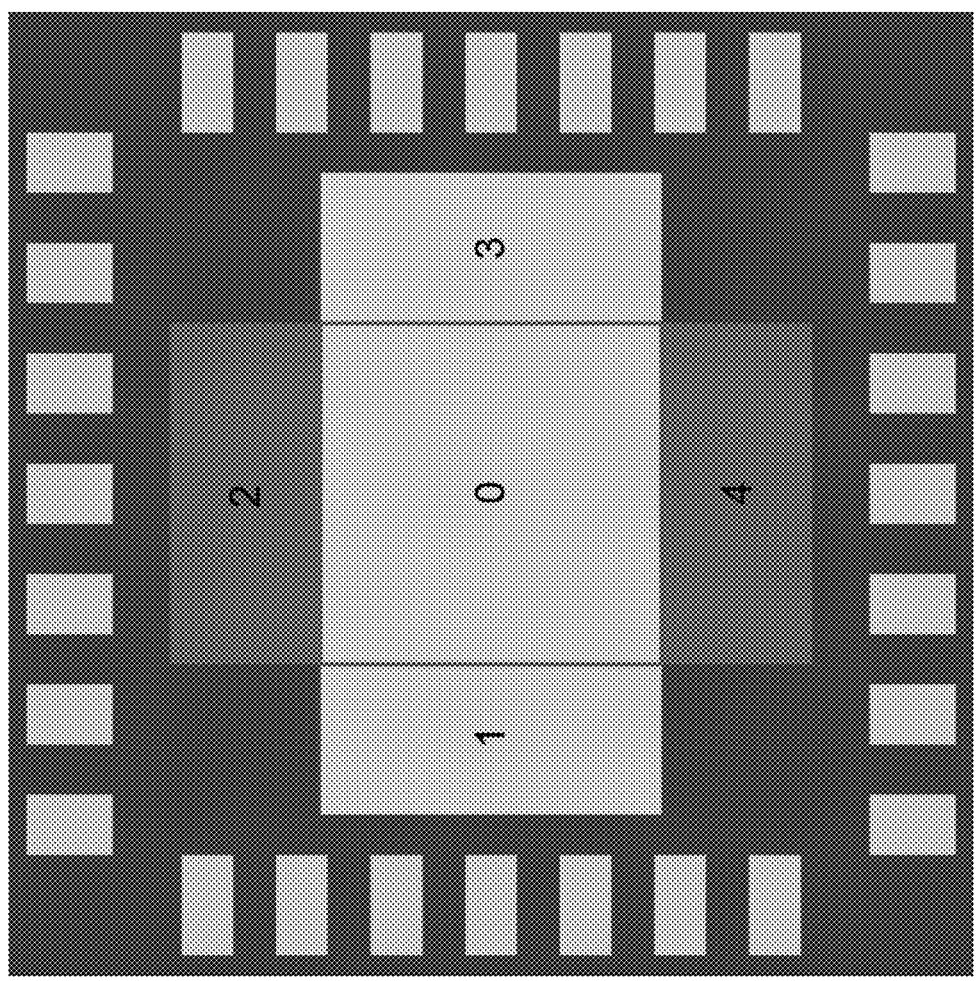
FIG. 2 shows an example of a sensor circuit configured in a landscape format.
Figure 3:
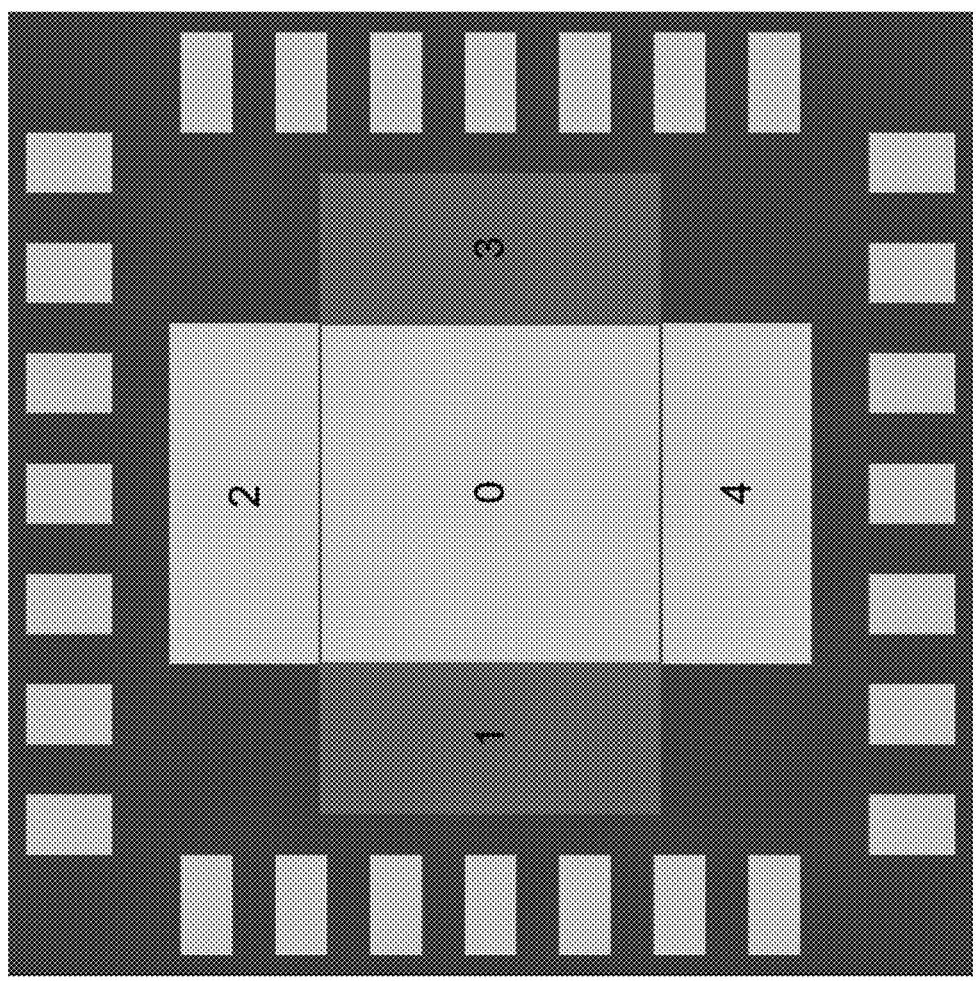
FIG. 3 shows an example of a sensor circuit configured in a portrait format.

The capturing of video/photo in landscape, portrait format separately or both formats simultaneously can be accomplished using one integrated circuit with a cross pattern image sensor (FIG. 1) that has pixels organized in 5 blocks, 0, 1, 2, 3 and 4. Block 0 is common, and is combined with blocks 1, 3 or with blocks 2, 4 for configuring the sensor as landscape or portrait format (FIGS. 2 & 3). The mode configurable pixel blocks 1 and 3, controlled by the processor in a default capture mode or by user selection, are mapped and joined with the common pixel block 0 to form a landscape image. Similarly, common pixel block 0 and mode configurable pixel blocks 2 and 4 are mapped and joined to form a portrait image.

In some embodiments, the image sensor is fabricated as a cross pattern. All pixels are X-Y addressable. The image sensor is a two-dimensional array of pixels. Each pixel has its own intensity value, a location address represented by X (row number) and Y (column number).

The pixel blocks 1, 2, 3 and 4, on command by the processor, are re-mapped, and re-configured to output an image that matches the format (landscape or portrait) selected by the user or by default.

The followings are 2 handheld orientations, each with 2 capture modes.

Figure 4:
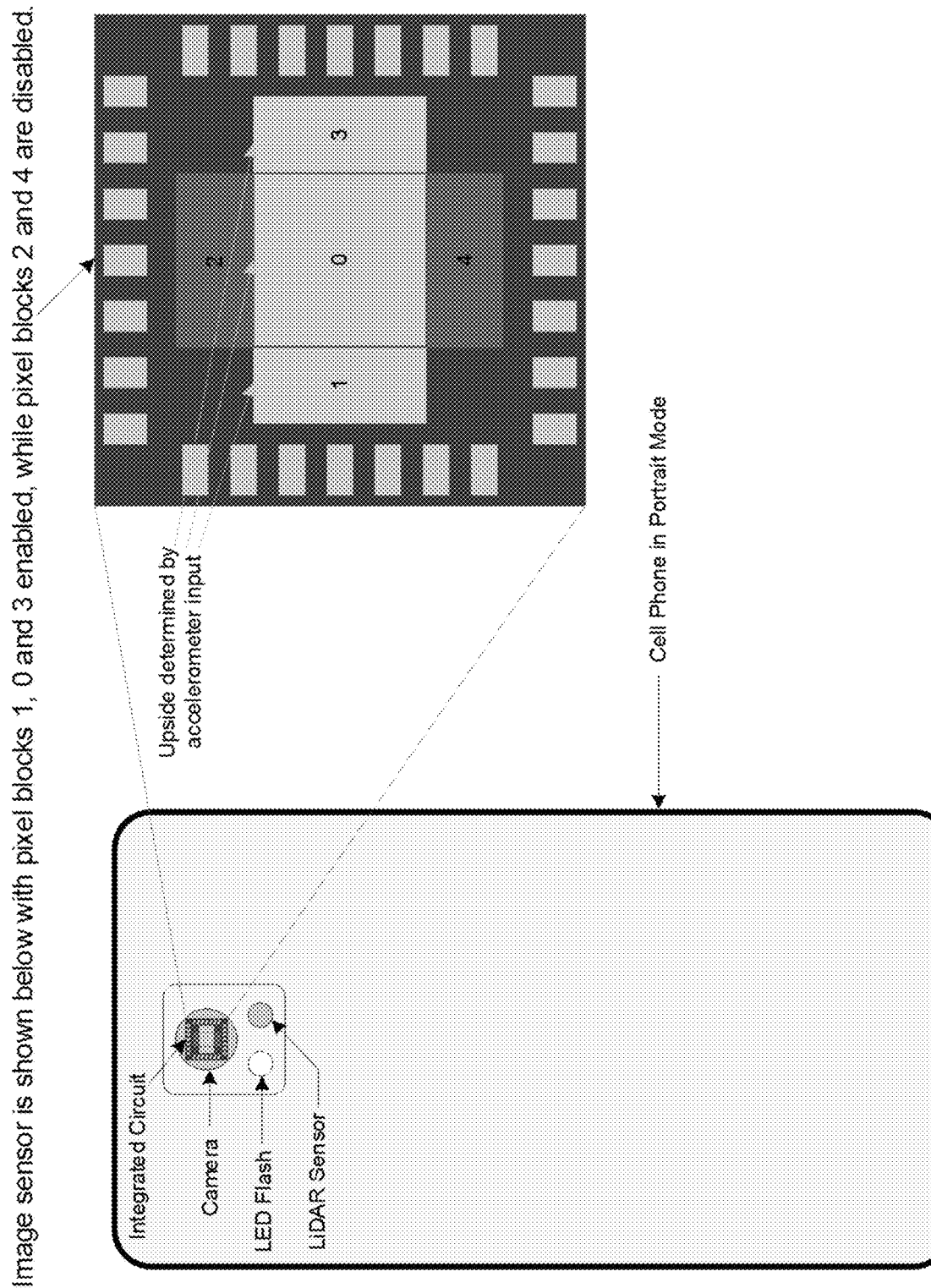
FIG. 4 shows an example of portrait mode operation of a camera.

1. If the default capture mode is landscape, the cellphone, held in portrait orientation, has its forward-facing camera with pixel blocks 1, 3 enabled and blocks 2, 4 disabled (FIG. 4). Note that block 0 is on when the camera is turned on. The upside (which side is up direction) of blocks 1, 0 and 3 are determined by an input from the accelerometer.

While the cellphone is held in portrait orientation and the capture mode is changed from landscape to portrait via onscreen touch selection. The forward-facing camera has pixel blocks 2, 4 enabled and blocks 1, 3 disabled.

Figure 5:
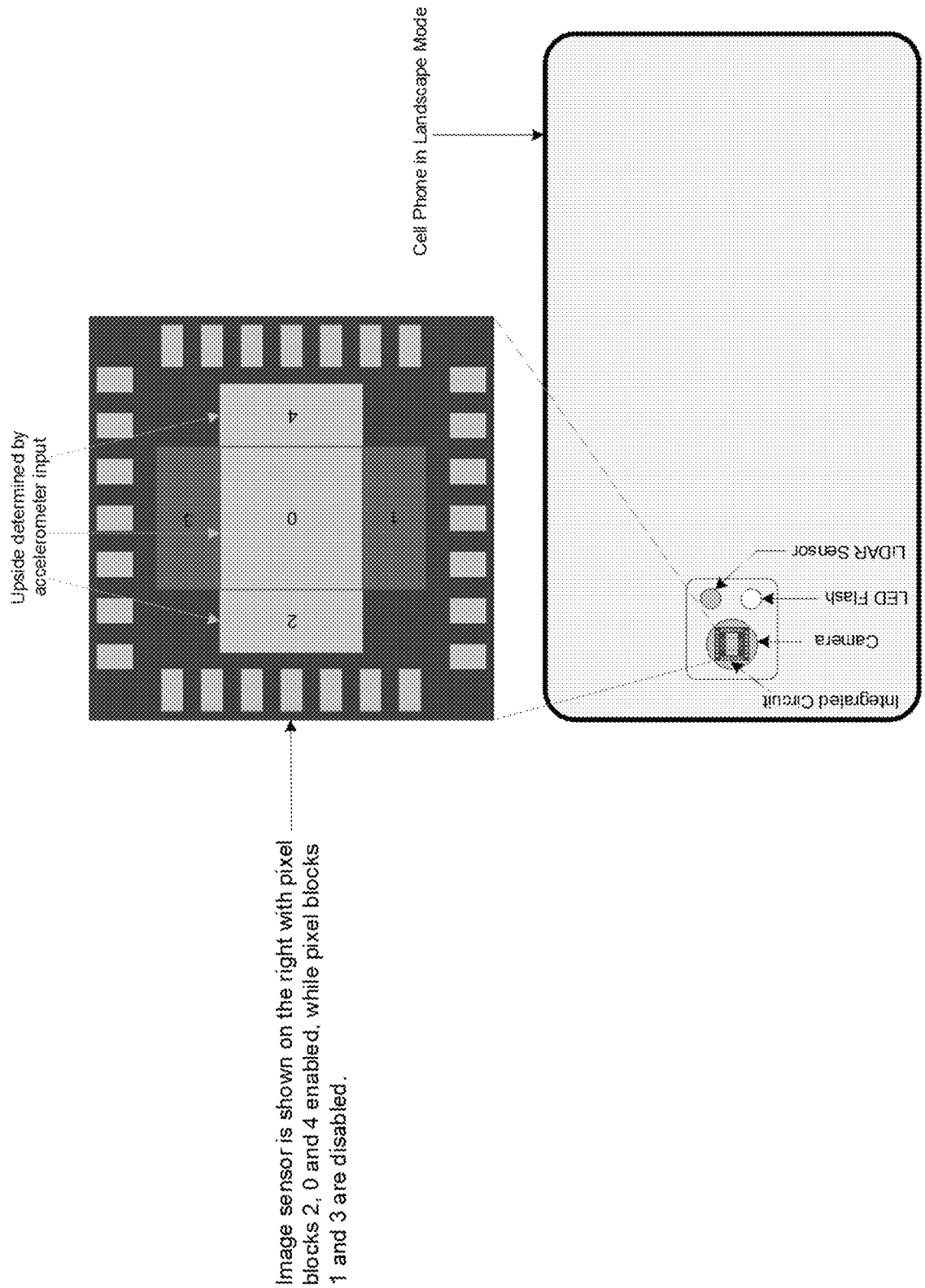
FIG. 5 shows an example of a landscape mode operation of a camera.

2. If the default capture mode is landscape, the cellphone, held in landscape orientation, has its forward-facing camera with pixel blocks 2, 4 enabled and blocks 1, 3 disabled (FIG. 5). Note that block 0 is on when the camera is turned on. The upside of blocks 2, 0 and 4 are determined by an input from the accelerometer.

While the cellphone is held in landscape orientation and the capture mode is changed from landscape to portrait via onscreen touch selection. The forward-facing camera has pixel blocks 1, 3 enabled and blocks 2, 4 disabled.

3. If the default capture mode is portrait, the cellphone, held in portrait orientation, has its forward-facing camera with pixel blocks 2, 4 enabled and blocks 1, 3 disabled.

While the cellphone is held in portrait orientation and the capture mode is changed from portrait to landscape via onscreen touch selection. The forward-facing camera has pixel blocks 1, 3 enabled and blocks 2, 4 disabled.

4. If the default capture mode is portrait, the cellphone, held in landscape orientation, has its forward-facing camera with pixel blocks 1, 3 enabled and blocks 2, 4 disabled.

While the cellphone is held in landscape orientation and the capture mode is changed from portrait to landscape via onscreen touch selection. The forward-facing camera has pixel blocks 2, 4 enabled and blocks 1, 3 disabled.

The followings are 2 handheld orientations, each with all 5 pixel blocks 0, 1, 2, 3, 4 simultaneously turned on for the simultaneous capture of landscape and portrait video/photo.

1. When the cellphone is held in portrait orientation, the video or photo is captured with all 5 pixel blocks enabled. For the photo session, the processor commands the integrated circuit to output 2 images, landscape and portrait, with the upside of all 5 pixel blocks determined by the accelerometer. In this case, the landscape photo is created by joining pixel blocks 1, 0, 3, and the portrait photo is created by joining pixel blocks 2, 0, 4. After capturing, the user can choose either format, landscape or portrait, to display onscreen.

For the video session, the processor commands the integrated circuit to output 2 separate video files, a landscape mode file and a portrait mode file, for display and storage. In this case, the landscape video is created by joining pixel blocks 1, 0, 3, and the portrait video is created by joining pixel blocks 2, 0, 4. For displaying while recording, the user can choose to display onscreen either landscape video or portrait video, and for playback, the user can choose either format for playback.

2. When the cellphone is held in landscape orientation, the video or photo is captured with all 5 pixel blocks enabled. For the photo session, the processor commands the integrated circuit to output 2 images, landscape and portrait, with the upside of all 5 pixel blocks determined by the accelerometer. In this case, the landscape photo is created by joining pixel blocks 2, 0, 4, and the portrait photo is created by joining pixel blocks 3, 0, 1. After capturing, the user can choose either format, landscape or portrait, to display onscreen.

For the video session, the processor commands the integrated circuit to output 2 separate video files, a landscape mode file and a portrait mode file, for display and storage. In this case, the landscape video is created by joining pixel blocks 2, 0, 4, and the portrait video is created by joining pixel blocks 3, 0, 1. For displaying while recording, the user can choose to display onscreen either landscape video or portrait video, and for playback, the user can choose either format for playback.

During simultaneous capturing session, the user can select, via onscreen touch icon, a display preview in either landscape or portrait format prior to capturing. The integrated circuit not only serves as the image sensor, but also serves as the media processor that provides simultaneous streaming of landscape and portrait video.

Figure 6:
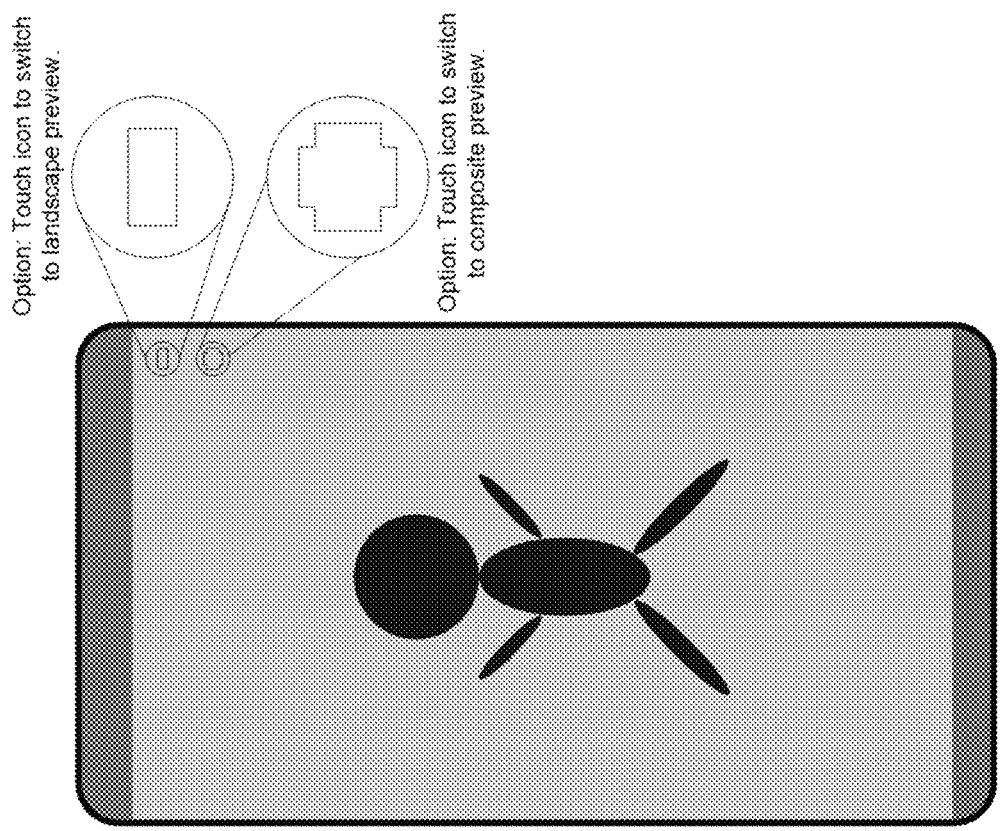
FIG. 6 shows an example of portrait mode preview generation.
Figure 7:
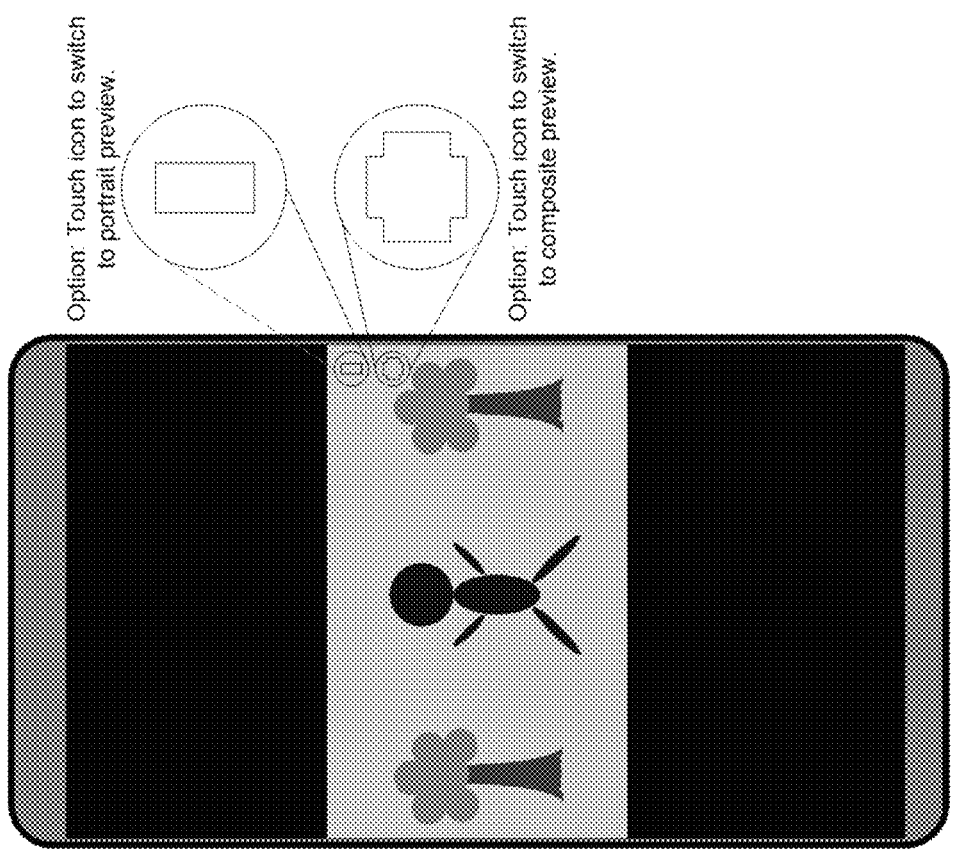
FIG. 7 shows an example of a landscape mode preview generation.
Figure 8:
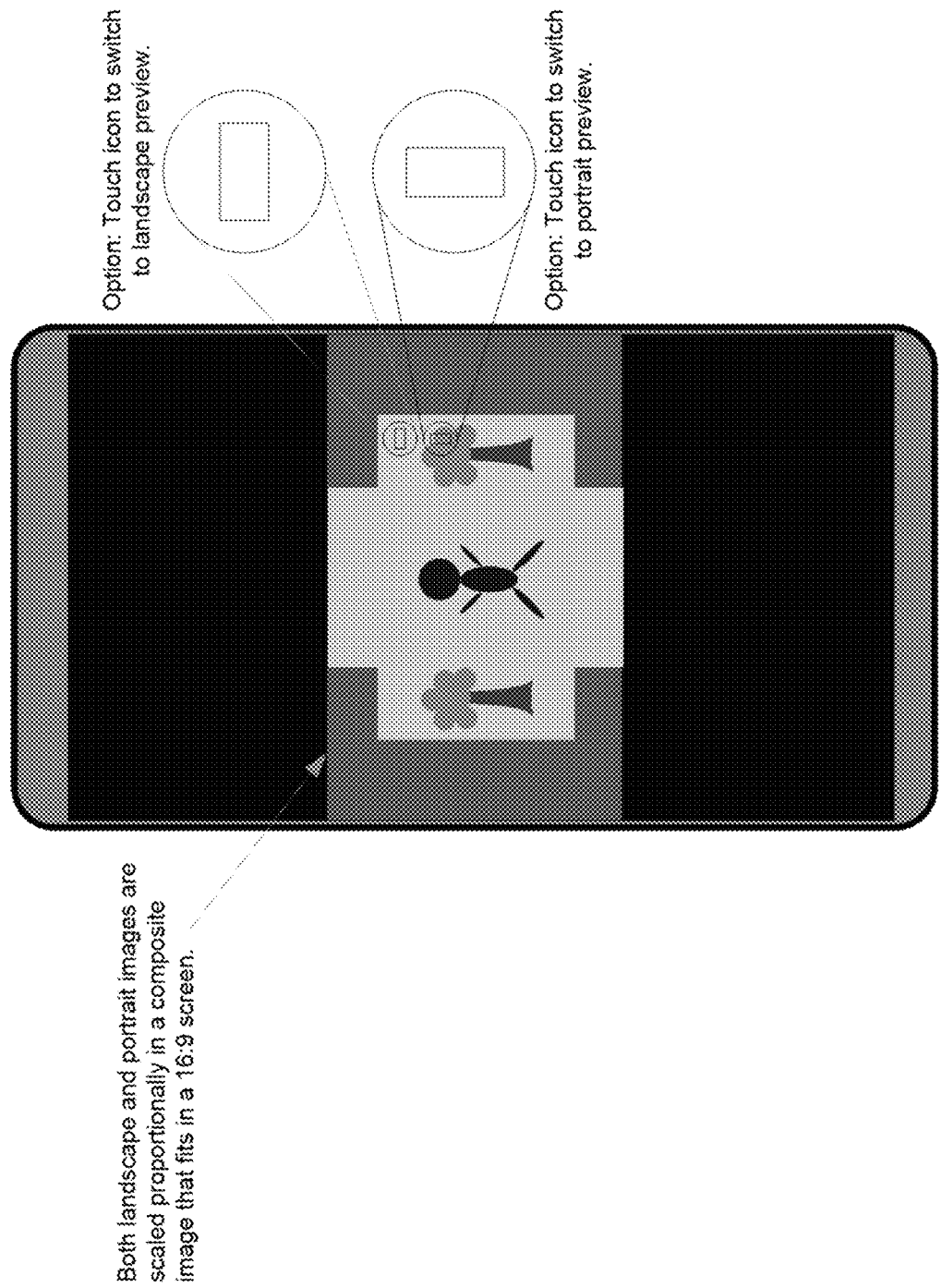
FIG. 8 shows an example of a 16:9 preview generation.

The sensor/media processor, prior to capturing, can generate a portrait preview (FIG. 6), a landscape preview (FIG. 7), or a composite preview of both landscape and portrait images by proportional scaling both images to fit in a screen of a given aspect ratio, for example, a 16:9 aspect ratio (FIG. 8). In each preview screen, there are 2 icons for the user to select the other two preview screens. In an alternate method, only one icon is used for preview selection, the first touch selects the second preview, the second touch selects the third preview, and the third touch rotates back to the first preview.

In some embodiments, to provide the functionality of 3D video/photo capture, two cameras are mounted, one on the top left corner and the other on the top right corner, to emulate the binocular vision that yields the 3D perception.

Because the disclosed combined integrated image sensor and media processor is distinguishable from convention image sensor only device, the Landscape and Portrait Sensor may be called LandPortSensor or LPSensor for short.

There are many types of LiDAR sensors (Light Detection and Ranging), and selecting the right one is important for a successful application. A LiDAR sensor is mounted near the camera, when activated, a light pulse is emitted light towards a distant subject. How long it takes for the reflected light to return to the sensor is used to determine the distance from the camera to the subject. Since all 5 pixel blocks are independently controlled, each pixel block can be turned on separately, and to capture image one at a time with distance measurement stored in metadata or displayed onscreen. This is a useful feature for investigative work or for other special interest activity.

With the LPSensor installed in the professional camera. It is no longer necessary for the photographer to tilt his camera in order to capture the portrait image. Since both formats can be previewed simultaneously or separately, he can capture either format separately or both formats simultaneously. It helps increase productivity.

Figure 9A:
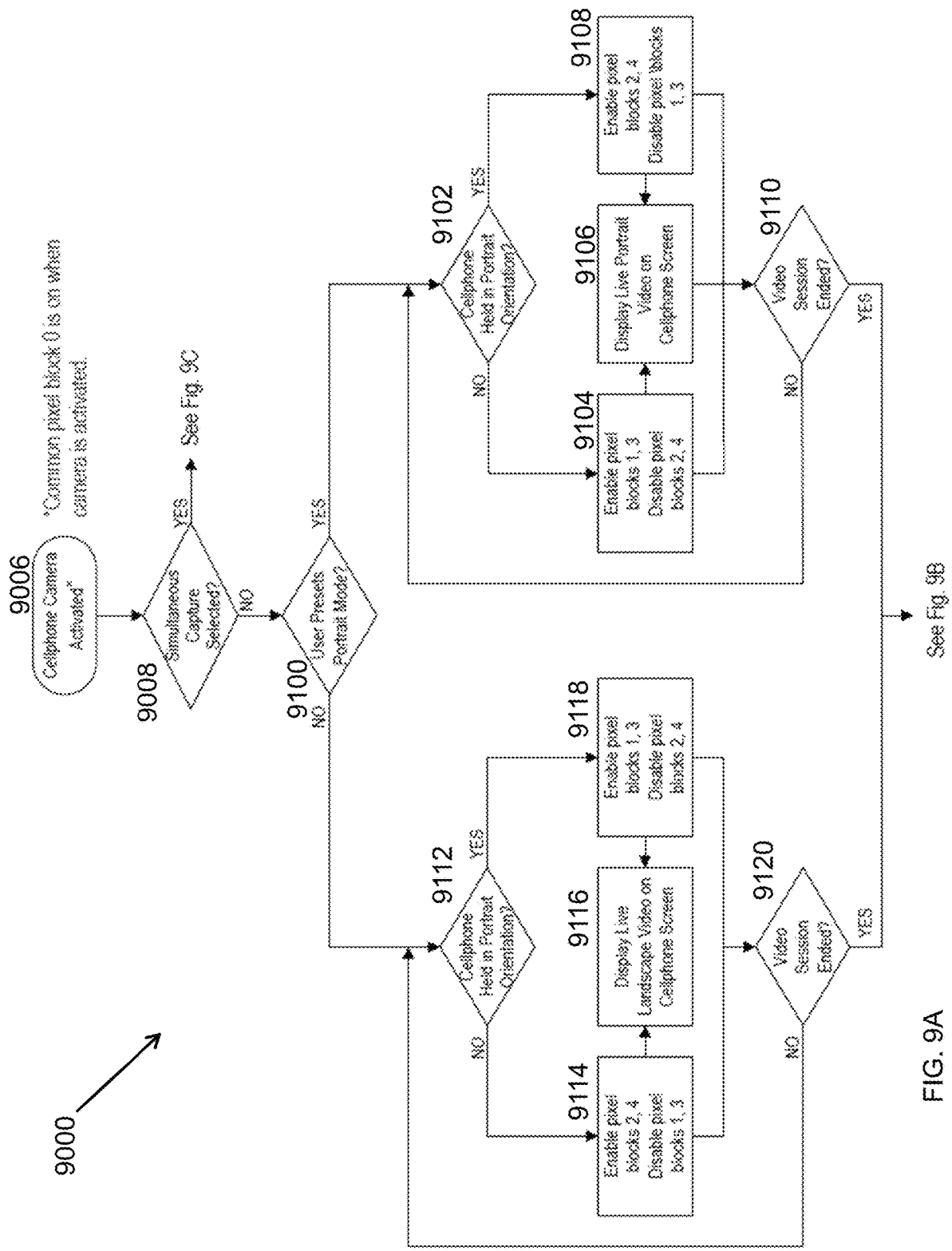
FIGS. 9A-9C show a flowchart of camera operation method examples.
Figure 9B:
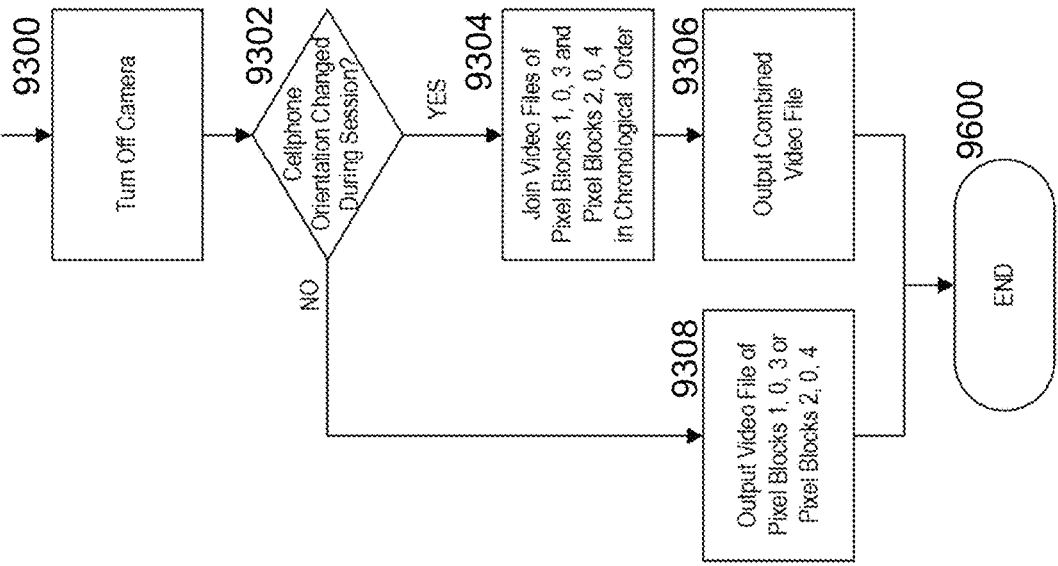
Figure 9C:
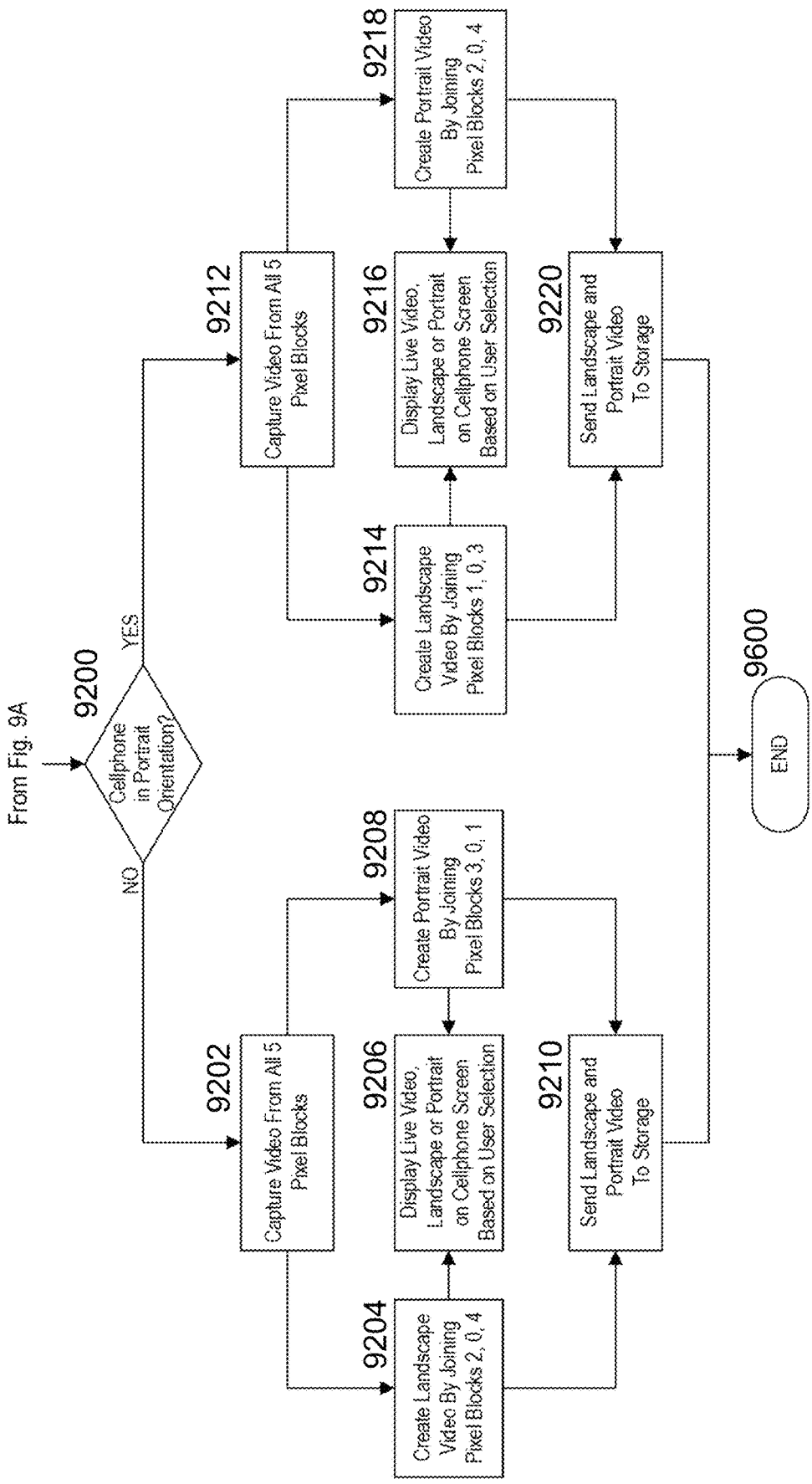
Figure 10:
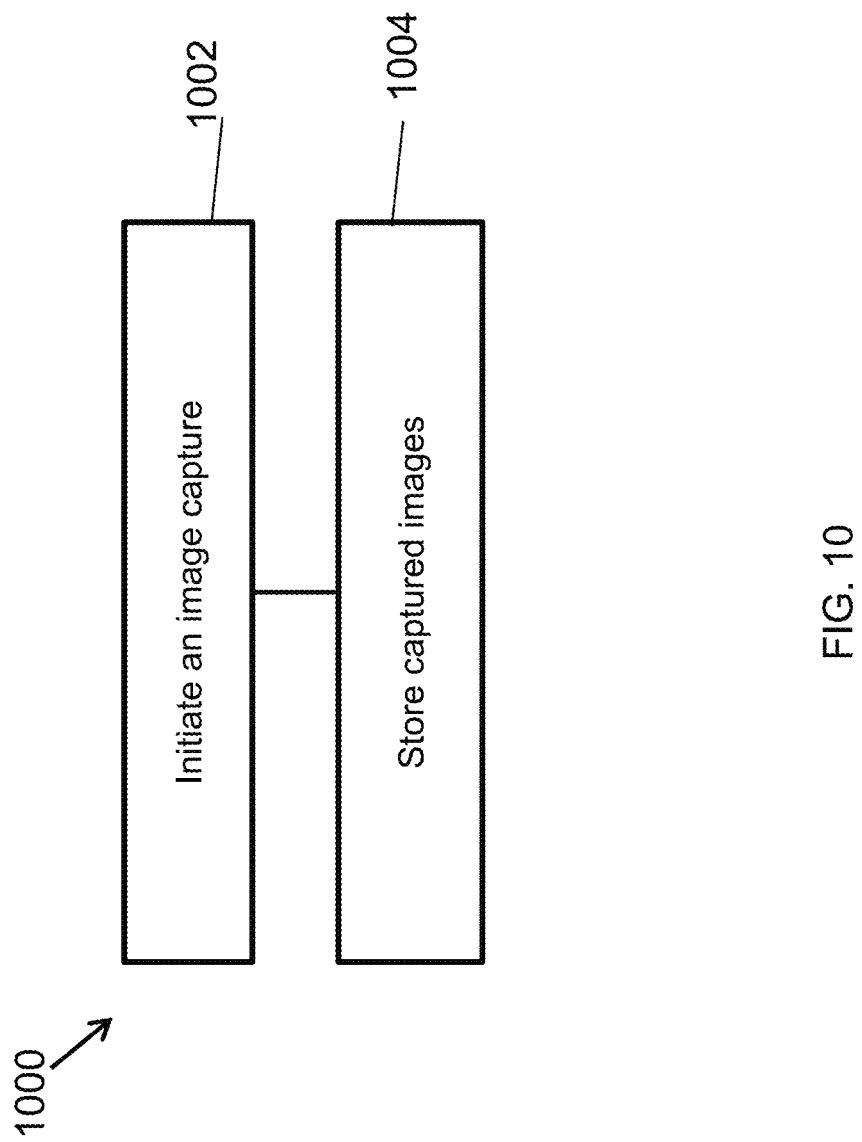
FIG. 10 shows a flowchart of an example method of operating a video capture device.

FIG. 9A, FIG. 9B and FIG. 9C together are the flowcharts illustrating a general method 9000 for a cellphone to capture images or videos. Method 9000 begins at starting block 9006, activating the camera. At step 9008, the cellphone determines if a simultaneous capture mode is selected. If the simultaneous capture mode is not selected, method 9000 continues to step 9100 in FIG. 9A. If the simultaneous capture mode is selected, method 9000 continues to step 9200 in FIG. 9B.

At step 9100, method 9000 determines if the user presets the portrait mode as capturing mode. If the portrait mode is already the preset mode, then at step 9102, the cellphone determines if the orientation of the cellphone is portrait. If the cellphone is in portrait orientation, the cellphone enables pixel blocks 2 and 4, but disables pixel blocks 1 and 3 (9108). However, if the cellphone is in landscape orientation, the cellphone enables pixel blocks 1 and 3, but disables pixel blocks 2 and 4 (9104). After enabling and disabling certain pixel blocks at steps 9108 or 9104, the cellphone screen displays the portrait live view (9106). At step 9110, if a video session is not ended, method 9000 continues back to step 9102 to determine if the cellphone is held in portrait orientation.

At step 9100, method 9000 determines if the user presets the portrait mode as capturing mode. If the portrait mode is not already the preset mode, then at step 9112, the cellphone determines if the orientation of the cellphone is portrait. If the cellphone is in portrait orientation, the cellphone enables pixel blocks 1 and 3, but disables pixel blocks 2 and 4 (9118). However, if the cellphone is in landscape orientation, the cellphone enables pixel blocks 2 and 4, but disables pixel blocks 1 and 3 (9114). After enabling and disabling certain pixel blocks at steps 9118 or 9114, the cellphone screen displays the landscape live view (9116). At step 9120, if the video session has not ended, method 9000 continues back to step 9112 to determine if the cellphone is held in portrait orientation.

When method 9000 determines that the video session has ended at either step 9110 or 9120, it turns off the camera at step 9300 (see FIG. 9C). Then at step 9302, method 9000 determines if the cellphone orientation has changed during the session. If the orientation has not changed during the session, at step 9308, method 9000 outputs either a video file of pixel blocks 1, 0, and 3, or a video file of pixel blocks 2, 0, and 4. If the orientation has changed, at step 9304, method 9000 joins video files of pixel blocks 1, 0, and 3; method 9000 further joins video files of pixel blocks 2, 0, and 4. At step 9304, method 9000 joins files in chronological order. At step 9306, method 9000 outputs a combined video file. At step 9600, the non-simultaneous capture mode stops.

At step 9008, method 9000 continues to step 9200 after determining the cellphone is in the simultaneous capture mode. At step 9200, method 9000 determines if the cellphone is in the portrait orientation. If the cellphone is at portrait orientation, at step 9212, method 9000 captures a video from all 5 pixel blocks. Then at step 9214, method 9000 creates a landscape video by joining pixel blocks 1, 0, and 3. At step 9218, method 9000 creates a portrait video by joining pixel blocks 2, 0, and 4. After steps 9214 and 9218, method 9000 continues to step 9216. At step 9220, method 9000 sends landscape and portrait videos to storage.

Again, at step 9200, method 9000 determines if the cellphone is in the portrait orientation. If the cellphone is not at portrait orientation, at step 9202, method 9000 captures a video from all 5 pixel blocks. Then at step 9204, method 9000 creates a landscape video by joining pixel blocks 2, 0, and 4. At step 9208, method 9000 creates a portrait video by joining pixel blocks 3, 0, and 1. After steps 9204 and 9208, method 9000 continues to step 9206. At step 9210, method 9000 sends landscape and portrait videos to storage. At step 9600, the simultaneous capture mode stops.

With respect to FIGS. 9A to 9C and FIG. 10, prior to image/video capture, the image capture device might provide a preview of both the landscape and the portrait mode on the user interface in a composite format (e.g., display that looks like "+" sign). In one operational mode, the user may be able to simultaneously capture to composite format and play back video in portrait-only, landscape-only or composite format.

According to various embodiments, the following technical solutions are provided to address various existing technical problems discussed in the present document, among other issues.

1. An image sensor apparatus (e.g., FIGS. 1 to 5 and FIG. 11), comprising: a first sensor array comprising a first plurality image sensors, a second sensor array comprising a second plurality image sensors; a third sensor array comprising a third plurality image sensors; a fourth sensor array comprising a fourth plurality image sensors; a fifth sensor array comprising a fifth plurality image sensors; wherein the second sensor array and the fourth sensor array are configured to be excluded from use for capturing images in a portrait format; wherein the third sensor array and the fifth sensor array are configured to be excluded from use for capturing images in a landscape format; and wherein the first sensor array is configured to be used for capturing images in the portrait format and the landscape format.

2. The apparatus of claim 1, wherein the first sensor array is a rectangular array having a height of H pixels and a width of W pixels, and wherein the second sensor array and the fourth sensor array have heights of H pixels and the third sensor array and the fifth sensor arrays have widths of W pixels.

3. The apparatus of claim 1, wherein the second sensor array is configured to capture a left-end portion of images in the landscape format and the fourth sensor array is configured to capture a right-end portion of images in the landscape format.

4. The apparatus of claim 1, wherein the third sensor array is configured to capture a top-end portion of images in the portrait format and the fifth sensor array is configured to capture a bottom-end portion of images in the portrait format.

In various embodiments, the above-disclosed blocks 0 to 4 may be organized in different ways. For example, in some embodiments, blocks 2 and 4 may have identical sizes. In some embodiments, blocks 1 and 3 may have identical sizes. Alternatively blocks 2 and 4 may have different sizes and/or blocks 1 and 3 may have different sizes. This may result in a capture region that is horizontally or vertically asymmetric with respect to the center block 0 of common pixels. The additional pixels to the top (bottom, left or right) may be used to insert metadata or fingerprinting information such as a date stamp or a location identifier that may be, at the option of the user, may be included in the visible image. In some embodiments, the block 0 may be square. In some embodiments, the block 0 may be a rectangle. For example, block 0 may be wider in a horizontal (landscape) direction to provide a wider panoramic picture. In some embodiments, block 0 may be taller in a vertical (portrait) direction to provide a wide height image. In some implementations, blocks 1, 2, 3 and 4 may be used to capture three dimensional information of the captured visual scene. For example, blocks 1 and 3 may hold left-eye, right-eye information of block 0 image.

5. The apparatus of claim 1, further comprising a media processor, wherein the media processor is electrically connected to the first, second, third, fourth, and fifth sensor arrays.

6. The apparatus of claim 1, further comprising a handheld structure housing the apparatus.

7. A method of capturing images (e.g., flowchart 1000 FIG. 10), comprising: initiating (1002) a capture of an image or a video capture based on an instruction received on a user interface of a camera that comprises:

a first sensor array comprising a first plurality image sensors, a second sensor array comprising a second plurality image sensors; a third sensor array comprising a third plurality image sensors; a fourth sensor array comprising a fourth plurality image sensors; a fifth sensor array comprising a fifth plurality image sensors; wherein the second sensor array and the fourth sensor array are configured to be excluded from use for capturing images in a portrait format; wherein the third sensor array and the fifth sensor array are configured to be excluded from use for capturing images in a landscape format; and wherein the first sensor array is configured to be used for capturing images in the portrait format and the landscape format; and storing (1004) the captured image or the video to three or more of the first to fifth sensor arrays according to the instruction.

8. The method of claim 7, further comprising: generating one or more previews prior to capturing, including a portrait preview, a landscape preview, or a composite preview; receiving at least one selection from the user interface to select between the portrait preview, the landscape preview, and the composite preview; and displaying the preview on a screen.

9. The method of claim 7, further comprising generating the composite preview of both landscape and portrait images, and scaling the composite preview to fit in the screen of a given aspect ratio.

10. The method of claim 7, further comprising: generating, after storing the captured image or video, a first file according to the landscape format and a second file according to the portrait format.

11. The method of claim 7 further comprising: generating a first file and a second file such that a first portion of the first file is exclusive to the first file; a second portion of the first file is shared with the second file; a portion of the second file is exclusive to the second file; and storing the first file and the second file in a memory.

12. An image sensor apparatus (e. g., FIGS. 1 to 5 and 11), comprising: a group of sensor arrays that includes non-overlapping sensor arrays including: a first sensor array, a second sensor array; a third sensor array; a fourth sensor array; a fifth sensor array; a processor coupled to the second sensor array, the third sensor array, the fourth sensor array and the fifth sensor array, wherein the processor is configured to: determining an orientation of the image sensor apparatus, and performing a selective disabling operation based on the orientation such that: in case that the orientation is a portrait format, a first subset of sensor arrays from the group of sensor arrays is disabled; and in case that the orientation is a landscape format, the second subset of sensor arrays from the group of sensor arrays is disabled, where the second subset of sensor arrays in different from the first subset of sensor arrays. For example, the processor may be processor 1102 depicted in FIG. 11. One embodiment is depicted in FIGS. 1 to 5, the first sensor array is pixel block 0, the second sensor array is pixel block 1, the third sensor array is pixel block 2, the fourth sensor array is pixel block 3, the fifth sensor array is pixel block 4.

13. The image sensor apparatus of claim 12, wherein the first subset of sensor arrays comprises the second sensor array and the fourth sensor array.

14. The image sensor apparatus of claim 12, wherein the second subset of sensor arrays comprises the third sensor array and the fifth sensor array.

15. The image sensor apparatus of claim 12, wherein the processor is configured to enable the first sensor array in the portrait format and the landscape format.

16. The image sensor apparatus of claim 12, wherein the first sensor array is a rectangular array having a height of H pixels and a width of W pixels, and wherein the second sensor array and the fourth sensor array have heights of H pixels and the third sensor array and the fifth sensor arrays have widths of W pixels.

17. The image sensor apparatus of claim 12, wherein the second sensor array is configured to capture a left-end portion of images in the landscape format and the fourth sensor array is configured to capture a right-end portion of images in the landscape format.

18. The image sensor apparatus of claim 12, wherein the third sensor array is configured to capture a top-end portion of images in the portrait format and the fifth sensor array is configured to capture a bottom-end portion of images in the portrait format.

19. The image sensor apparatus of claim 12, further comprising a handheld structure housing the image sensor apparatus.

20. The image sensor apparatus of claim 12, wherein the processor is configured to determine the orientation using an input received at a user interface or using an orientation sensor.

In various embodiments, the above-disclosed arrays 0 to 4 may be organized in different ways. For example, in some embodiments, arrays 2 and 4 may have identical sizes. In some embodiments, arrays 1 and 3 may have identical sizes. Alternatively arrays 2 and 4 may have different sizes and/or arrays 1 and 3 may have different sizes. This may result in a capture region that is horizontally or vertically asymmetric with respect to the center array 0 of common pixels. The additional pixels to the top (bottom, left or right) may be used to insert metadata or fingerprinting information such as a date stamp or a location identifier that may be, at the option of the user, may be included in the visible image. In some embodiments, the array 0 may be square. In some embodiments, the array 0 may be a rectangle. For example, array 0 may be wider in a horizontal (landscape) direction to provide a wider panoramic picture. In some embodiments, array 0 may be taller in a vertical (portrait) direction to provide a wide height image. In some implementations, arrays 1, 2, 3 and 4 may be used to capture three dimensional information of the captured visual scene. For example, arrays 1 and 3 may hold left-eye, right-eye information of array 0 image.

The entire foregoing descriptions also applies to the user-facing camera.

Figure 11:
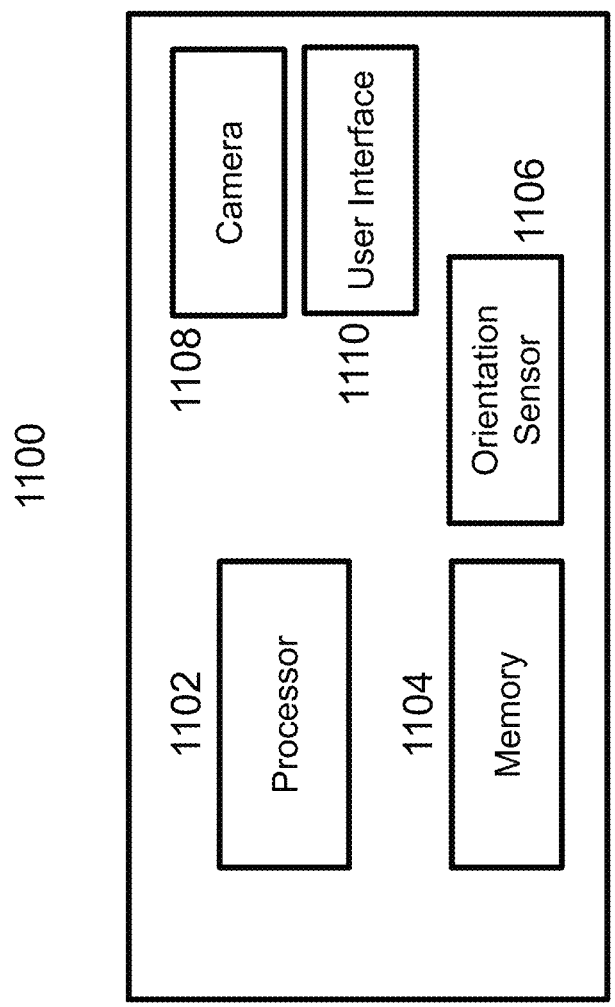
FIG. 11 is a block diagram of a video capture device.

FIG. 11 shows an example video capture device 1100. The device 1100 includes a processor 1102 configured to perform the methods disclosed in the present document. The device 1100 includes a memory that is used for storing processor-executable code and/or image files. The memory may be internal to the processor 1102. The device 1100 includes an orientation sensor that is configured to determine a tilt angle or orientation of the camera (e.g., portrait mode, landscape mode, or something in between). The device 1100 includes a camera that comprises an image sensor as disclosed herein. The device 1100 includes a user interface 1110 that may be configured to receive user inputs (e.g., buttons, touchscreen, etc.) and/or displaying images and interactive menu to the user.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of capturing images or video using a camera, comprising:
    determining that a simultaneous capture mode is not selected;
    checking whether a first orientation mode is selected;
        upon determining that the first orientation mode is selected and the simultaneous capture mode is not selected, performing:
        in case that the camera is currently held in the first orientation mode, enabling a first subset of image sensor pixels and disabling a second subset of image sensor pixels;
        in case that the camera is currently held in the second orientation mode, enabling the second subset of image sensor pixels and disabling the first subset of image sensor pixels; and
        upon determining that the first orientation mode is not selected and the simultaneous capture mode is not selected, performing:
        in case that the camera is currently held in the first orientation mode, enabling the second subset of image sensor pixels and disabling the first subset of image sensor pixels;
        in case that the camera is currently held in the second orientation mode, enabling the first subset of image sensor pixels and disabling the second subset of image sensor pixels; and
        capturing images of video according to the enabling and the disabling.

2. The method of claim 1, wherein the first orientation mode is a portrait mode and the second orientation mode is a landscape mode.

3. The method of claim 1, wherein the first orientation mode is a landscape mode and the second orientation mode is a portrait mode.

4. The method of claim 1, further including displaying the images of video on a screen of the camera.

5. The method of claim 1, wherein the camera is included in a cellphone.

6. A method of capturing images or video using a camera, comprising:
    determining that a simultaneous capture mode is selected;
    checking whether a first orientation mode is selected;
        upon determining that the first orientation mode is not selected and the simultaneous capture mode is selected:
        capturing an image or a video using a first subset of image sensor pixels, a second subset of image sensor pixels and a third subset of image sensor pixels;
        storing the image or the video in the first orientation mode using the first subset of image sensor pixels and the third subset of image sensor pixels;
        storing the image or the video in a second orientation mode using the second subset of image sensor pixels and the third subset of image sensor pixels; and
        upon determining that the first orientation mode is selected and the simultaneous capture mode is selected:
        capturing the image or the video using the first subset of image sensor pixels, the second subset of image sensor pixels and the third subset of image sensor pixels;
        storing the image or the video in the first orientation mode using the second subset of image sensor pixels and the third subset of image sensor pixels;
        storing the image or the video in a second orientation mode using the first subset of image sensor pixels and the third subset of image sensor pixels.

7. The method of claim 6, wherein the first orientation mode is a portrait mode and the second orientation mode is a landscape mode.

8. The method of claim 6, wherein the first orientation mode is a landscape mode and the second orientation mode is a portrait mode.

9. The method of claim 6, further including displaying the images or the video on a screen of the camera.

10. The method of claim 6, wherein the camera is included in a cellphone.

11. An apparatus comprising one or more processors configured to implement a method, comprising:
    determining that a simultaneous capture mode is not selected;
    checking whether a first orientation mode is selected;
        upon determining that the first orientation mode is selected and the simultaneous capture mode is not selected, performing:
        in case that the apparatus is currently held in the first orientation mode, enabling a first subset of image sensor pixels and disabling a second subset of image sensor pixels;
        in case that the apparatus is currently held in the second orientation mode, enabling the second subset of image sensor pixels and disabling the first subset of image sensor pixels; and
        upon determining that the first orientation mode is not selected and the simultaneous capture mode is not selected, performing:
        in case that the apparatus is currently held in the first orientation mode, enabling the second subset of image sensor pixels and disabling the first subset of image sensor pixels;
        in case that the apparatus is currently held in the second orientation mode, enabling the first subset of image sensor pixels and disabling the second subset of image sensor pixels; and
    capturing images of video according to the enabling and the disabling.

12. The apparatus of claim 11, wherein the first orientation mode is a portrait mode and the second orientation mode is a landscape mode.

13. The apparatus of claim 11, wherein the first orientation mode is a landscape mode and the second orientation mode is a portrait mode.

14. The apparatus of claim 11, wherein the apparatus includes a screen configured to display the image or the video.

15. The apparatus of claim 11, wherein the apparatus comprises a cellphone.

16. An apparatus comprising one or more processors configured to perform a method, comprising:
    determining that a simultaneous capture mode is selected;
    checking whether a first orientation mode is selected;
        upon determining that the first orientation mode is not selected and the simultaneous capture mode is selected:
        capturing an image or a video using a first subset of image sensor pixels, a second subset of image sensor pixels and a third subset of image sensor pixels;
        storing the image or the video in the first orientation mode using the first subset of image sensor pixels and the third subset of image sensor pixels;
        storing the image or the video in a second orientation mode using the second subset of image sensor pixels and the third subset of image sensor pixels; and
        upon determining that the first orientation mode is selected and the simultaneous capture mode is selected:
        capturing the image or the video using the first subset of image sensor pixels, the second subset of image sensor pixels and the third subset of image sensor pixels;
        storing the image or the video in the first orientation mode using the second subset of image sensor pixels and the third subset of image sensor pixels;
        storing the image or the video in a second orientation mode using the first subset of image sensor pixels and the third subset of image sensor pixels.

17. The apparatus of claim 16, wherein the first orientation mode is a portrait mode and the second orientation mode is a landscape mode.

18. The apparatus of claim 16, wherein the first orientation mode is a landscape mode and the second orientation mode is a portrait mode.

19. The apparatus of claim 16, wherein the apparatus includes a screen configured to display the image or the video.

20. The apparatus of claim 16, wherein the apparatus comprises a cellphone.

* * * * *